United States Patent Office 3,076,046
Patented Jan. 29, 1963

3,076,046
CONVERSION OF HYDROCARBONS
Lynn H. Estes, El Dorado, Ark., assignor to Monsanto Chemical Company, St. Louis, Mo., a corporation of Delaware
No Drawing. Filed Feb. 1, 1960, Ser. No. 5,639
14 Claims. (Cl. 260—673.5)

The present invention relates to the catalytic conversion of hydrocarbons, and more particularly, to the conversion of paraffin hydrocarbons to aromatic hydrocarbons by contacting said paraffin hydrocarbons under suitable reaction conditions with a catalyst capable of dehydrogenation and cyclization of paraffin hydrocarbons to aromatic hydrocarbons.

Aromatic hydrocarbons are rapidly increasing in importance in our present day chemical industry. They are the starting materials in the synthesis of a great many of industry's widely used organic chemicals, chemical intermediates, and products. For example, the plastics, detergent, and automotive industries are placing a heavy demand on aromatic hydrocarbon production.

The aliphatic hydrocarbons, especially the paraffinic members of the group, are in plentiful supply from natural gasolines, from refinery streams separated from crude petroleum, and from refinery cracking operations. The unsaturated aliphatic hydrocarbons are themselves valuable as chemical reactants and are generally, where practical, separated from the saturated aliphatic hydrocarbons. The lower octane rated saturated aliphatic hydrocarbons which remain find little use at the present time, as compared with the other hydrocarbon classes, in the chemical industry. Therefore, the chemical and petroleum industries are continually searching for new and improved methods by which these lower valued saturated paraffinic hydrocarbons may be converted to more valuable products. The conversion of paraffinic hydrocarbons to aromatic hydrocarbons is an example.

The method of converting paraffinic hydrocarbons to aromatic hydrocarbons is known as dehydrocyclization since both dehydrogenation and cyclization take place in the conversion. Methods of causing the dehydrocyclization of paraffin hydrocarbons to aromatic hydrocarbons are well known in the art. Numerous catalysts and processes have been proposed for carrying out this reaction. However, few, if any of these processes have found their way into commercial applications. Several reasons are responsible for this. Primary among these are poor yields, poor catalyst life, inability to regenerate, a high ratio of regeneration time to synthesis time, and necessity of relatively pure paraffin hydrocarbon feed.

It is, therefore, an object of this invention to provide an improved method for the dehydrocyclization of paraffin hydrocarbons to aromatic hydrocarbons. It is a particular object of this invention to provide a new and novel catalyst for the process of converting paraffin hydrocarbons to aromatic hydrocarbons. A more specific object of this invention is to provide a new and novel catalyst for the process of converting lower molecular weight liquid n-paraffin hydrocarbons such as hexane to the corresponding aromatic hydrocarbons by dehydrogenation-cyclization.

In fulfillment of the objectives set forth above it has been discovered that a catalyst comprising an oxide of tin together with an oxide of an element from the left hand side of group VI of the periodic table and an oxide of an alkali metal, e.g., sodium, potassium, rubidium, cesium, etc., and supported on a support of suitable chemical and physical properties will cause the dehydrocyclization of paraffin hydrocarbons to aromatic hydrocarbons with good yields. A catalyst of this type also decreases the rate of deposition of carbonaceous materials, thus increasing the catalytic reaction time allowable between regeneration or burn-off of the deposited carbon. This, of course, contributes to a longer catalyst life.

The following examples are given to specifically illustrate the invention described herein. These examples are not, however, to be in any manner construed as limiting the objects, applications, or conditions of the invention herein set forth.

Example I

A n-hexane concentrate containing 95.0 mol percent n-hexane, 2.57 mol percent methylcyclopentane and 2.43 mol percent 3-methyl pentane was passed through a catalytic reactor containing a dehydrocyclization catalyst. The catalyst was composed of 9 percent by weight $Cr_2O_3$, 1.75 percent by weight $SnO_2$ and 1.25 percent by weight $K_2O$ supported on 1/8 inch diameter alumina pellets of 125 square meters per gram surface area and an average pore diameter of 160 angstroms. All weight percents are based on total catalyst weight. The reaction was carried out at a temperature of approximately 540° C. and at a space velocity of 0.5 volumes of liquid feed per hour per volume of catalyst. The benzene produced represented a 46.6 percent by weight conversion based on the amount of n-hexane charged. The carbon deposition was approximately 2.45 percent by weight based on total catalyst in a 2-hour synthesis cycle.

Example II

Using a feed comprised of 95.0 mol percent n-hexane and 2.47 mol percent methylcyclopentane and a contact temperature of 540° C. with a space velocity of 0.5 volume of feed per hour per volume of catalyst and a catalyst comprising the alumina base support described in Example I, 9 percent by weight $Cr_2O_3$ and 1.25 percent by weight $K_2O$, the amount of $SnO_2$ was varied with the following results as to carbon deposition.

| Percent by weight $SnO_2$ | Percent by weight carbon |
|---|---|
| None | 2.80 |
| 1.75 | 2.45 |
| 2.50 | 1.87 |
| 5.30 | 1.72 |

The catalyst which is the subject of this invention comprises an oxide of tin, and an oxide of an element from the left hand column of group VI of the periodic table, an alkali metal oxide, and is supported on a suitable base support. The left hand column of group VI of the periodic table is made up of chromium, molybdenum, and tungsten. Though the oxides of any of these may be used the oxide of chromium is preferred. The oxides of sodium, potassium, rubidium, and cesium may be used as the alkali metal oxide. The preferred alkali metal oxide is the oxide of potassium.

The preferred base support used in the catalyst is preferably alumina of a surface area of approximately 125 square meters per gram and with an average pore diameter of approximately 160 angstroms. Customary supports ranging in surface area from 50 to 400 square meters per gram or higher may be used, however. Also, pore diameter ranges of from 40 to 320 angstroms and higher may be present in these supports.

It is obvious from the examples given herein that the oxides of tin and the alkali metals have a deterring effect upon the formation of carbonaceous deposits. This is further shown in Table I below.

TABLE I

| Composition by Wt. percent of active constituents of catalyst | Wt. percent carbon deposited |
| --- | --- |
| 9% Cr$_2$O$_3$ | 3.65 |
| 9% Cr$_2$O$_3$, 1.25% K$_2$O | 2.80 |
| 9% Cr$_2$O$_3$, 1.25% K$_2$O, 1.75% SnO$_2$ | 2.45 |

Obviously, the amounts of the oxide of tin and the alkali metal oxide should be balanced in a given process for optimum results. The presence of the oxide of tin causes a decreased carbon deposition, while the alkali metal oxide causes an increase in the yields of aromatic hydrocarbons. As the amount of the oxide of tin is increased beyond approximately 2 percent by weight there is a rather rapid drop in the yields, however, there is also a rapid decrease in carbon deposition. Therefore, the quantity of the oxide of tin present is somewhat dependent upon the desired ratio between yield and carbon deposition. A preferred amount of the oxide of tin is between 0.5 and 6 percent by weight of the total catalyst. A more preferred range is approximately 1.0 to 2.0 percent by weight of the total catalyst. The use of the alkali metal oxide markedly improves the yields of aromatic hydrocarbons although such use causes a slight increase in carbon deposition. As in the case of the oxide of tin, the optimum amount depends upon the ratio of yield to carbon deposition that is desired. A range for the alkali metal oxide is from 0.5 to 6.0 percent by weight of the total catalyst. A more preferred range for the alkali metal is 0.5 to 2.0 percent by weight.

The quantity of the oxide of chromium, the preferred oxide of an element from the left hand column of group VI of the periodic table, present in the catalyst may vary somewhat without an appreciable change in amount of carbon deposition and with only a small change in yields. An increase of from 9 to 12 percent by weight chromium oxide brings about a very slight change in the amount of carbon deposited. The preferred range of quantity of chromium oxide is from 9 to 12 percent by weight when using an alumina of about 125 square meters per gram, although both higher and lower amounts of the chromium oxide may be used. This range of concentration may also be applied to the oxides of elements from the left hand side of group VI of the periodic table other than the oxide of chromium if they are used in the catalyst herein disclosed.

The optimum amounts of the tin oxide, alkali metal oxide, and oxide of the left hand column of group VI of the periodic table will vary with the surface area and average pore diameter of the support. Higher surface areas generally require a higher level of each component on a weight percent of catalyst basis.

The catalyst may be prepared by conventional processes such as impregnation, co-gelation, co-precipitation, precipitation, etc. In the conventional method disclosed herein, the alumina support is usually calcined at 550° to 700° C. and thereafter thoroughly dried at 500 to 650° C. for at least one additional hour or more. It is cooled and then thoroughly wetted with a solution containing the first active component, preferably the Cr$_2$O$_3$ which is added as CrO$_3$. This is followed by filtering off the liquid and drying at 130 to 160° C. for approximately 16 hours. The catalyst is then calcined at 550° C. for approximately 16 hours, then reduced for 1½ hours to prevent loss of CrO$_3$ during the next impregnation. Next, the tin is placed upon the catalyst from a solution of a salt of tin in a suitable solvent, the salt being one decomposable to an oxide. Stannous tartrate in water is an example of a suitable impregnating solution. The filtering, drying, calcining and reduction steps are then repeated. The alkali metal oxide is placed on the catalyst from a solution of an alkali metal salt thermally decomposable to an oxide. The nitrates of the alkali metals are suitable salts. The filtering, drying, calcining, and reduction steps are repeated for the alkali metal.

In carrying out the process of this invention a suitable temperature must be maintained in the reaction zone. This temperature may be in the range of 510 to 600° C. but more preferably in the range of 535° to 575° C. The optimum yield temperature is very closely related to the space velocity. As the space velocity is increased the optimum yield temperature will also increase. The space velocity may range from 0.1 to 2.0 volumes of liquid feed per hour per volume of catalyst. The preferred rate is approximately 0.5 to 1.0 volumes of liquid feed per hour per volume of catalyst.

The pressure at which the process may be operated may range from sub-atmospheric to 100 or more p.s.i.g. It is preferred to operate the process at approximately atmospheric pressure or slightly above, e.g., 5 to 10 p.s.i.g.

The preferred feedstock anticipated for use with the catalyst described herein is one containing an approximate minimum of 90 mol percent n-paraffin and a naphthene maximum of 5 mol percent. However, the invention will operate with lower paraffin and/or higher naphthene content but the efficiency of the reaction is somewhat impaired as the composition is deviated beyond these limits. A low naphthene content is desirable because of the carbon forming tendency of the naphthenes under the relatively severe operating conditions necessary for the dehydrocyclization of n-paraffins. The lower the naphthene content, the longer the reaction may be carried out without a shutdown for regeneration. The n-paraffin hydrocarbons which may be used in the practice of this invention contain at least 6 carbon atoms and preferably 6 to 12 carbon atoms. This includes n-hexane, n-heptane, n-octane, n-nonane, n-decane, n-undecane, and n-dodecane. Branched chain hydrocarbons, preferably slightly branched hydrocarbons of at least 6 carbon atoms, e.g., 6 to 12 carbon atoms in one chain, also may undergo dehydrocyclization with this invention. Examples of such branched chain paraffin hydrocarbons are methyl hexanes, methyl heptanes, dimethyl hexanes, dimethyl heptanes, ethyl heptanes, etc.

When regeneration becomes necessary due to the carbon on the catalyst surface, practically any conventional method of carbon removal may be used. The thermal stability limits of the catalyst will, of course, limit some potential regeneration techniques. The maximum catalyst temperature limit is approximately 700° C. A logical inexpensive carbon removal system is air oxidation. Any of several methods may be used for controlling the temperature during the extremely exothermic regeneration. Among these are limitation of regeneration gas flow rates, oxygen content of regeneration gases, use of heat absorbing mediums, high velocity air flow, etc. The heat of regeneration may be removed by conventional heat exchange equipment in a fluidized regeneration system.

The method of contacting the catalyst with the feed may involve either adiabatic or isothermal operations in a conventional fixed moving or fluidized bed. The fluidized bed may be of the single vessel or multi-vessel circulating type. Those skilled in the art will see that a wide variety of mechanical designs of each of these types may serve to carry out the desired aromatic production.

What is claimed is:

1. The process of dehydrogenation and cyclization of paraffinic hydrocarbons to aromatic hydrocarbons comprising contacting paraffinic hydrocarbons of at least 6 carbon atoms under dehydrocyclization conditions with a catalyst comprising 0.5 to 6.0 percent by weight of an oxide of tin, 0.5 to 6.0 percent by weight of an oxide of an alkali metal, and an oxide of an element from the left hand column of group VI of the periodic table and a base support containing a surface area of 50 to 400 square meters per gram and an average pore diameter of at least 40 angstroms.

2. The process as described in claim 1 wherein the paraffinic hydrocarbons are n-paraffin hydrocarbons.

3. The process as described in claim 1 wherein the paraffinic hydrocarbons are n-paraffin hydrocarbons of from 6 to 12 carbon atoms.

4. The process as described in claim 1 wherein the paraffinic hydrocarbon is n-hexane.

5. The process as described in claim 1 wherein the amount of an oxide of tin present is from 1 to 2 percent by weight of the catalyst.

6. The process as described in claim 1 wherein the alkali metal oxide is an oxide of potassium.

7. The process as described in claim 1 wherein the element from the left hand column of group VI of the periodic table is chromium.

8. The process as described in claim 1 wherein the base support is alumina of 125 square meters per gram and the average pore diameter is of 160 angstroms.

9. The process of dehydrogenation and cyclization of paraffinic hydrocarbons to aromatic hydrocarbons comprising contacting paraffinic hydrocarbons of at least 6 carbon atoms in a straight chain, under dehydrocyclization conditions, with a catalyst comprising 0.5 to 6.0 percent by weight of an oxide of tin, 0.5 to 6.0 percent by weight of an oxide of an alkali metal selected from the group consisting of sodium, potassium, rubidium, and cesium, and an oxide of an element from the left hand column of group VI of the periodic table and a base support containing a surface area of 50 to 400 square meters per gram and an average pore diameter of at least 40 angstroms.

10. The process of dehydrogenation and cyclization of paraffinic hydrocarbons to aromatic hydrocarbons comprising contacting paraffinic hydrocarbons of at least 6 carbon atoms at a temperature of 535 to 575° C. and a space velocity of 0.5 to 1.0 volumes liquid feed per hour per volume of catalyst with a catalyst comprising 0.5 to 6.0 percent by weight of an oxide of tin, and 0.5 to 6.0 percent by weight of an oxide of an alkali metal, and an oxide of an element from the left hand side of group VI of the periodic table, and an alumina support of approximately 50 to 400 square meters per gram and containing average pore diameters of at least 40 angstroms.

11. The process as described in claim 10 wherein the alumina support is one of 125 square meters per gram surface area and an average pore diameter of 160 angstroms and the oxide of an alkali metal is the oxide or potassium and the amount of the oxide of potassium is 0.6 to 2.0 percent by weight of the catalyst.

12. The process as described in claim 10 wherein the oxide of an element from the left hand column of group VI of the periodic table is the oxide of chromium and the amount of the oxide of chromium is from 9 to 12 percent by weight of the catalyst.

13. The process as described in claim 10 wherein the paraffinic hydrocarbons are n-paraffinic hydrocarbons of 6 to 12 carbon atoms.

14. The process as described in claim 10 wherein the paraffinic hydrocarbon is n-hexane.

References Cited in the file of this patent

UNITED STATES PATENTS

| | | |
|---|---|---|
| 2,785,210 | Schmetterling et al. | Mar. 12, 1957 |
| 2,846,363 | Folkins et al. | Aug. 5, 1958 |
| 2,888,497 | Pitzer | May 26, 1959 |